United States Patent Office 3,518,529
Patented June 30, 1970

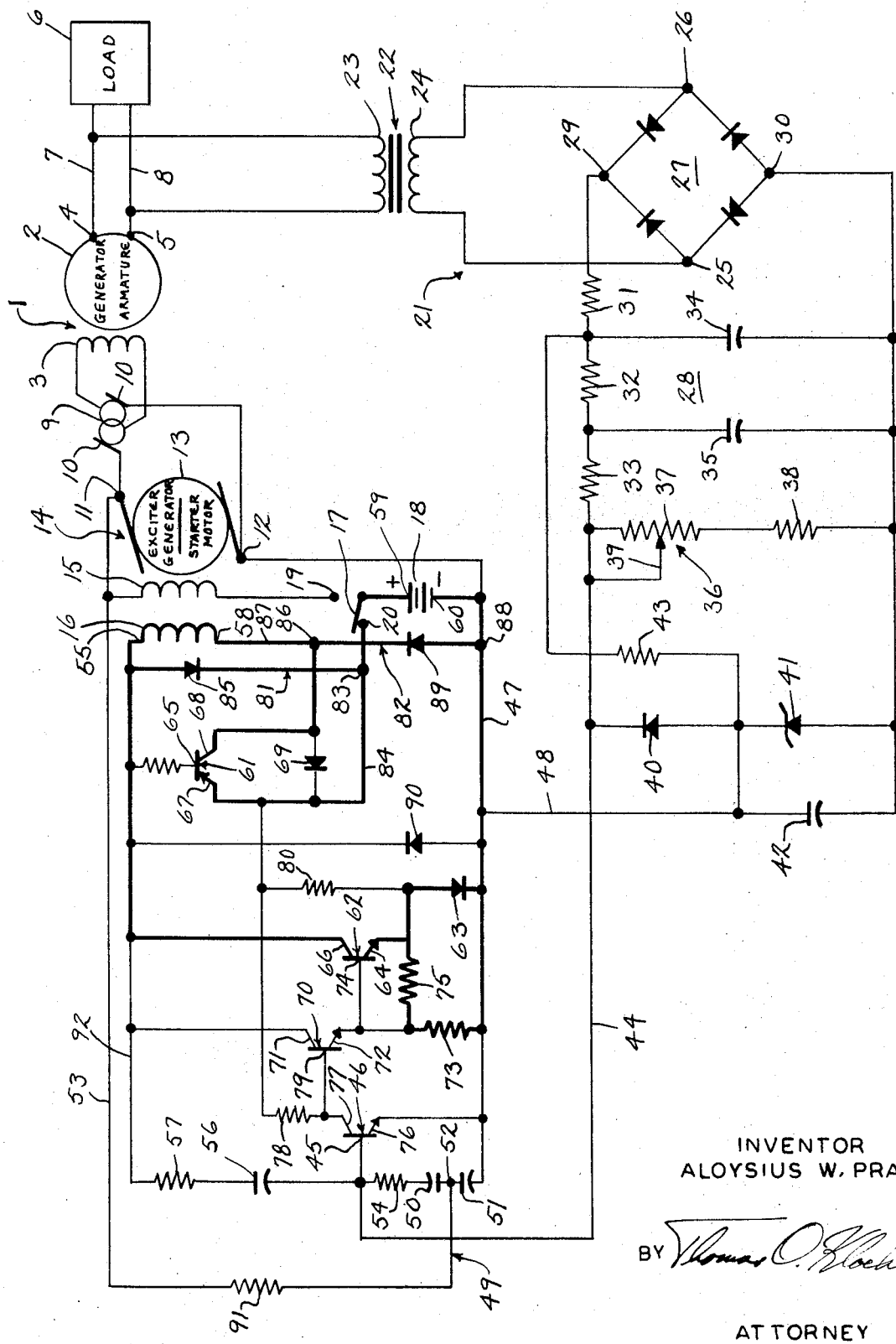

3,518,529
GENERATOR VOLTAGE REGULATOR
Aloysius W. Pratt, New Carlisle, Ohio, assignor to Kohler Co., Kohler, Wis., a corporation of Wisconsin
Filed Aug. 8, 1967, Ser. No. 659,125
Int. Cl. H02p 9/30
U.S. Cl. 322—28    10 Claims

ABSTRACT OF THE DISCLOSURE

A rectified sample of line voltage provides a feedback signal for controlling the excitation of the alternator. Cascaded NPN transistors and a PNP transistor on opposite sides of the field winding of the exciter control field current supplied by a battery. An NPN transistor detector receiving the feedback signal controls the cascaded NPN transistors, which control the PNP transistor. The exciter field winding discharges through blocking diodes against battery polarity. The transistor detector is also capacitively coupled to the exciter armature for stabilization and to the exciter field winding for switching efficiency.

BACKGROUND OF THE INVENTION

The present invention was created for generator sets in which a prime mover, usually an internal combustion engine, drives an alternator, which typically have outputs, ranging from 10 kw. to 200 kw. Generator sets of this sort are commonly used to provide emergency back-up power for hospitals and other public buildings, or they may be used to provide normal operating power, both as an alternative to public power, as well as at remote sites where public power is not available. In any case, close regulation of the generator is required so that the output voltage remains substantially constant regardless of fluctuations in the line load. Since this generator should be able to operate unattended, the voltage regulation must be automatic. To maintain substantially constant voltage, slight fluctuations in line voltage and the current operating status of the set itself must be detected instantaneously and fed back to control elements to make appropriate corrections in the operation of the set. It is also highly desirable that the voltage regulator and related control circuitry be entirely static so as to avoid the maintenance problems associated with moving parts.

There has been rather prolific development of solid state voltage regulators for use in automobiles, airplanes, boats and other vehicles in recent years, but the problems encountered in automotive electrical systems are considerably different than those confronted by electrical systems for which the present invention was developed. Some vehicular systems are disclosed in the following U.S. Pats. 2,809,301, 2,896,149, 2,975,352, 2,992,383, 3,069,616, 3,072,839, 3,121,837, 3,129,378, 3,136,940, 3,138,751. By contrast, the present invention was created for use with larger size systems having constant speed prime movers, but being subject to fluctuating loads, similar to those referred to in U.S. Pat. Nos. 2,930,843 and 3,209,235.

SUMMARY OF THE INVENTION

The present invention relates to a voltage regulator in which field winding of a generator that controls a regulated voltage is energized by a D-C source, and a field control means responsive to fluctuations in the regulated voltage is connected between the D-C source and one end of the field winding. The invention also resides in the connection of a field forcing switch means between the D-C source and another end of the field winding along with a negative forcing discharge circuit which connects the field winding across the D-C source and which contains unidirectional conducting components to block the flow of energizing current, so that when the flow of energizing current from the D-C source to the field winding is interrupted the induced EMF from the field may be discharged through said negative forcing discharge circuit against the polarity of the D-C source. In addition, the invention resides in control circuitry for the above mentioned field control means and field forcing switch means including a source of feedback signal from the regulated voltage that is connected to control the conductance of a field control means, which in turn controls the conductance of the field forcing switch means. The invention also resides in a stabilizing circuit for use in applications where the above mentioned field winding is the field winding for an exciter generator that controls the excitation of the generator producing the regulated voltage, and, in this context, the invention includes a circuit that produces feedback signals from the exciter armature and the exciter field which signals participate with the feedback signal from the regulated voltage in controlling the excitation of the generator.

This invention was created to provide a voltage regulator for a generator, such as is described above as well as below, capable of highly sensitive and rapid response to line voltage changes. That goal can be achieved many ways in a laboratory that has a high budget, no space limitations and where maintenance is not a factor. However, the present invention attains the ultimate objective in a commercial generator unit by minimizing costs, size of the package, power dissipation with its heat problems, and maintenance requirements, while maximizing stability, reliability and operational life.

BRIEF DESCRIPTION OF THE DRAWINGS

The drawing is a schematic diagram of a preferred embodiment of the present invention.

DESCRIPTION OF THE PREFERRED EMBODIMENT

The preferred embodiment of the present invention shown in the drawing is a voltage regulator for a generator set. More accurately, this embodiment is used with a series of motor generator sets of varying power capacities, but to clarify the nature of this embodiment let it be assumed that the generator shown is a 30 kw. generator. The three-phase line voltage output is 120/208/240 volts, operating at a frequency of 50/60 c.p.s., but only the first phase, which is sensed for the purposes of the present invention, is illustrated in the drawing. The regulator shown has a maximum voltage of 22 volts, a maximum continuous current of 3 amps. and maximum peak current, for 2 minutes of 6 amps. The regulator voltage output goes from a maximum of 22 volts to a minimum, which is essentially zero, when the line voltage sensed is increased 2 percent above the preset value. The voltage regulator maintains the voltage output substantially constant for all operating conditions by controlling the field power of a rotary exciter. The regulator is completely static, thus eliminating the maintenance problems of moving parts.

As is evidenced in the drawing, the generator has a rotating field alternator 1, with an armature 2, and rotating field 3. The output terminals 4 and 5 (only two being shown here to avoid unnecessary complexity) of the armature 2 are connected across a load 6 by power lines 7 and 8. The rotating field 3 receives its excitation through slip rings 9 and brushes 10, and the brushes 10 are connected to output terminals 11 and 12 across an armature 13 of a dynamo 14, which serves both as an exciter generator 14 and starter motor 14. Since the dynamo 14 serves the two functions mentioned, it has separate field windings 15 and 16 for each function. A starter switch 17 alternately connects a D-C field source 18, in the form of a 24-volt battery 18, through either a starter contact 19 to the starter field winding 15 or through an exciter contact 20 to the exciter field winding 16. Although not shown to avoid undue complexity in the drawing, the prime mover of the generator set shown here may be assumed to be a diesel engine that is mechanically connected to the exciter generator and starter motor 14, which alternately drives and is driven by the same as the situation requires, and which is mechanically connected to drive the rotary field 3 of the alternator 1.

The output of the alternator 1 across its output terminals 4 and 5 is controlled through the excitation of the rotary field 3, which in turn is controlled by appropriately varying the output of the exciter generator 14 across its output terminals 11 and 12. The output of the exciter generator 14 is likewise controlled by controlling the energization of its field winding 16. It is the function of the present invention to maintain the voltage on the power lines 7 and 8 substantially constant regardless of variations in the load 6. To accomplish this purpose, this embodiment of the invention senses the voltage across the power lines 7 and 8, the output of the exciter generator 14 and the field strength of the exciter 14, and it employs the information thus obtained to control the current flow between and through the 24-volt battery 18 and the field 16 of the exciter 14. In this embodiment, these functions are accomplished by means of the circuitry and components described below.

A line voltage detector 21 includes a transformer 22, which has a primary winding 23 connected across the power lines 7 and 8 to sample line voltage, and a secondary winding 24, connected across input terminals 25 and 26 of a fullwave, diode bridge rectifier 27. A filter circuit 28 is connected across positive and negative output terminals 29 and 30, respectively, of the rectifier 27. The filter circuit 28 is made up of three resistors 31, 32 and 33 connected in series to the positive output terminal 29 of the bridge rectifier 27 and two filter capacitors 34 and 35 connected across the output terminals 29 and 30 of the rectifier 27 on either side of the second resistor 32. A feedback signal potentiometer 36 has its resistance element 37 connected in series with a fixed resistor 38 across the output of the filter circuit 28, and its sliding contact 39 connected in common with the positive end of the resistance element 37 to provide a feedback signal. A blocking diode 40 and a Zener diode 41 are also connected in series across the filter circuit 28 in parallel with the feedback potentiometer 36, and a capacitor 42 is connected across the Zener diode 41, the anode of which is connected through a resistor 43 to the junction between the first two filter resistors 31 and 32, so that a fixed reference signal will appear at the anode of the Zener diode 41.

The line voltage feedback signal reflecting the line voltage taken from the sliding contact 39 appears, via a conductor 44 on a base 45 of an NPN transistor 46 which functions as an error detector. The reference signal taken from the anode of the Zener diode 41 is connected to a common base line 47 by conductor 48. The common base line 47 would, in some instances, be a common ground, but for clarity of illustration it is shown here as a conductor.

A stabilizer 49 for this voltage regulator imposes feedback signals from the output terminals 11 and 12 of the exciter 14 on the base 45 of the error detector transistor 46. The stabilizer 49 may be considered to be a pair of filters: a low pass filter, consisting of a resistor 91 in a conductor 53 from the output terminal 11 of the exciter 14 and a capacitor 51 in series between the resistor 91 and the common base line 47, to shunt out the inevitable ripple in the D-C output of the exciter 14; and a high pass filter consisting of a series connected capacitor 50 and resistor 54 between the exciter output feedback conductor 53 and the base 45 of the error detector transistor 46 to block the D-C output but to pass the undulations of the exciter 14 output as it responds to conditions on the lines 7 and 8.

The base 45 of the error detector transistor 46 is also capacitively coupled to a normally negative end 55 of the exciter field winding 16 through an exciter field feedback conductor 92 containing an isolating capacitor 56 and a resistor 57 connected in series. (The other end of the exciter field winding 16 may be designated the positive end 58 since it is normally connected to the positive terminal 59 of the 24-volt battery 18, just as the so-called negative end 55 is normally connected to a negative terminal 60 of the 24-volt battery 18 through the common base line 47.) The isolating capacitor 56 will block D-C, but it will pass voltage fluctuations in the field responsive to the regulator's action. The signal passed by the field feedback conductor 92 will reinforce the line feedback signal from the conductor 44 to force the error detector transistor 46 to operate as a switch rather than a variable impedance.

A PNP transistor 61, which functions as a field forcing switch to isolate a negative forcing circuit described infra, has its emitter-collector circuit connected in series between the positive terminal 59 of the battery 18 and the positive end 58 of the exciter field winding 16. An NPN power transistor 62, which serves as a field control switch to control the flow of energizing current through the exciter field 16, has its emitter-collector circuit connected between the negative terminal 60 of the battery 18 and the negative end 55 of the exciter field winding 16, and a protective diode 63 is inserted between an emitter 64 of the field control transistor 62 and the common base line 47 and return to the negative terminal 60 of the battery 18. The field forcing transistor 61 has its base 65 connected to a collector 66 of the control transistor 62 so that the conductivity of the field forcing transistor 61 is controlled by the conduction of the control transistor 62. The field forcing transistor 61 has its emitter 67 connected to the positive terminal 59 of the battery 18 and its collector 68 connected to the positive end 58 of the generator field winding 16. A protective diode 69 is connected across the emitter-collector circuit of the field forcing transistor 61 to provide a transient by-pass.

The field control transistor 62 is connected in cascade with an amplifier transistor 70, which is an NPN power transistor that has its collector 71 connected to the negative end 55 of the exciter field winding 16 and its emitter 72 connected through a resistor 73 to the common base line 47 and thus to the negative terminal 60 of the battery 18. A base 74 of the control transistor 62 is connected to the emitter 72 of the amplifier transistor 40 and a bias resistor 75 connects the emitter 64 of the control transistor 62 to the emitter 72 of the amplifier transistor 70.

The error detector transistor 46 has its emitter 76 connected to the common base line 47 and its collector 77 connected through a resistor 78 to the positive terminal 59 of the battery 18. The collector 77 of the error detector transistor 46 is also connected to a base 79 of the amplifier transistor 70. The control circuit for the cascaded amplifier transistor 70 and control transistor 62 is completed by a biasing resistor 80 that connects the emitter 64 of a control transistor 62 to the positive terminal 59 of the battery 18. Hence, the error detector transistor 46 controls the conductivity of the amplifier transistor 70, which controls the conductivity of the control transistor 62, and the conductivity of the control transistor 62 controls the conductivity of the field forcing transistor 61. Due in part to the effect of the exciter field feedback through the resistor 57 and the capacitor 56, the detector transistor 46 operates as a switch, and therefore, drives the amplifier transistor 70 to operate as a switch and the field control and forcing transistors 62 and 61 to also operate as switches.

A field forcing circuit formed of two legs 81 and 82 connects the negative end 55 of the exciter field winding 16 to the positive terminal 59 of the battery 18 and the positive end 58 of the field winding 16 to the negative terminal 60 of the battery 18. The first leg 81 of the field forcing circuit is connected between a junction 83 in a conductor 84 which connects the emitter 67 of the field forcing transistor 61 to the exciter contact 20 of the starter switch 17, and the negative end 55 of the field winding 16. The first leg 81 of the field forcing circuit contains a blocking diode 85 that is oriented to block the flow field energizing current from the positive terminal 59 of the battery 18, otherwise it would shunt out the exciter field 16 and the field forcing transistor 61. The second leg 82 of the field forcing circuit is connected between a junction 86 with a conductor 87 which joins the collector 68 of the field forcing transistor 61 to the positive end 58 of the field winding 16, and a junction 88 with the common base line 47. The second leg 82 of the field forcing circuit also contains a blocking diode 89, which is oriented to block a flow current to the negative terminal 60 of the battery 18, otherwise it too could shunt out the exciter field 16. Because of the potentiality for the generation of large transient currents, a transient protective diode 90 is connected between the negative end 55 of the field winding 16 and the common base line 47, and it is oriented to block current flow toward the common base line 47 return to the negative terminal 60 of the battery 18.

To start the generator set, close the starter switch 17 to its starting contact 19 to energize the starter field winding 15 and cause the starter motor 14 to turn over the prime mover (not shown). When the prime mover (not shown) is operating, move the starter switch 17 back to the position shown in the drawing, so that it is closed to the exciter contact 20 and the field winding 16. With less than the preset maximum voltage across the power lines 7 and 8, no feedback signal is generated at the sliding contact 39 of the feedback potentiometer 36 and the error detector transistor 46 remains nonconductive. Current then flows from the positive terminal 59 of the battery 18 through the resistor 78 and the base circuit of the amplifier transistor 70 turning on the amplifier transistor 70.

The current flow through the amplifier transistor 70 provides base current to turn on the field control transistor 62, and the conductance of the field control transistor 62 turns on the field forcing transistor 61. Current may now flow from the positive terminal 59 of the battery 18 through the field forcing transistor 61 to the positive end 58 of the exciter field winding 16, through the exciter field winding 16, out the negative end 55 of the exciter field winding 16 and through the field control transistor 62 and the cascaded amplifier transistor 70 to the common base line 47 and back to the negative terminal 60 of the battery 18.

The current in the exciter field winding 16 will continue to flow in the manner described until there is a sudden decrease in the load 6. The load drop is sensed through the transformer 22, rectified in the bridge rectifier 27 and filtered through the filter circuit 28, and it appears as a line voltage feedback signal on the sliding contact 39 of the feedback potentiometer 36. This line voltage feedback signal flows to the base 45 of the error detector transistor 46 through the conductor 44, and it provides the necessary base current to turn on the error detector transistor 46, the conductance of which shunts out the base current for the amplifier transistor 70. The disruption of its base current turns off the amplifier transistor 70, and the nonconductance of the amplifier transistor 70 interrupts the base current of the field control transistor 62, turning it off. When the field control transistor 62 no longer conducts, the field forcing transistor 61 is also turned off.

If the load drop is slight, the line feedback signal will be correspondingly small and tend merely to trigger a slight conductivity of the detector transistor 46, which slight conductivity would only reduce the conductivity of the amplifier, control and forcing transistors 70, 62 and 61. However, the field feedback signal reinforces the line feedback signal to the detector transistor 46 driving it toward full conductivity with the result that the other transistors 61, 62 and 70 are switched off. If the transistors 46, 61, 62 and 70 are permitted to operate as variable impedances, instead of switches, the resulting dissipation of power causes heat dissipation problems. When the transistors 46, 61, 62 and 70 operate as switches, they turn off and on with much greater frequency, there is a minimal power dissipation and the average field voltage is calculated from the ratio of "on" time to "off" time.

When the excited field winding 16 is de-energized by turning off the power transistors 61, 62 and 70, its magnetic field collapses and induces a voltage across the field winding 16 causing the negative end 55 of the field winding 16 to become positive, and the positive end 58 to become negative. This induced voltage must be limited to a value below the maximum rating of the transistor. Also, the induced voltage must be dissipated by current flow if the "off" is of extended duration, but the resulting flow of current through the exciter field 16 will tend to manifest itself in a voltage surge in the power lines 7 and 8 that could reach destructive proportions, unless EMF in the exciter field 16 can be dissipated rapidly outside of the field winding 16.

If no current path is provided for field dissipation, the transistor in series with the field would need a maximum rating for in excess of anything practicable. A simple shunt conductor containing a diode to block field energizing current could serve the purpose (in the art this is sometimes called "free wheeling") except for long time required for the dissipation of the field and the resulting voltage surge on the line. Resistances have been connected across the field winding to hasten the decay of the field, but the resistance must be high and the resistors must be capable of dissipating large amounts of heat, and the transistor must have a high enough rating to withstand the voltage developed. The result is a large and expensive package with a sacrifice of efficiency. A Zener diode could be connected across the field to limit the voltages developed, but a Zener diode with a sufficiently high rating would be too expensive.

To achieve a rapid dissipation of the induced voltage, or EMF, the present invention provides the negative forcing circuit which imposes the induced EMF across the battery 18 in opposition to, or against the polarity of that battery 18. The current from the induced EMF will flow through the blocking diode 85 of the first leg 81 of the negative forcing circuit into the positive terminal 59 of the battery 18, through the battery 18, out the negative terminal 60 of the battery 18 and back to the field 16 through the common base line 47 and the second leg 82 of the field forcing circuit. The voltage seen by the transistors 61, 62 and 70 is limited to the 24-volt output of the battery, so inexpensive transistors 61, 62 and 70 with relatively low ratings may be used. Of course, the battery 18 can easily withstand any such induced voltages and the resulting current.

Since relatively large time constants inhere in such a regulator, the stabilizer 49 is provided to reflect any instantaneous change in the output of the armature 13 of the excite generator 14. So long as the system remains stable, no current can flow from the armature output terminal 11 through the conductor 53 to the base 45 of the error detector transistor 46 because the D-C component of the output is blocked by the blocking capacitor 50 above the junction 52, and the ripple component of the D-C output is shunted to the common base line 47 through the filter capacitor 51. However, as the output of the exciter 14 increases or decreases, the component of the increase or decrease is fed to the base 45 of the detector transistor 46 tending to cause an immediate countering response by the voltage regulator, seeking to restore the output to its previous level.

It is evident from the foregoing description that a voltage regulator embodying the present invention will effect an instantaneous response to any change in the load 6 on the power lines 7 and 8. Small changes in the load 6 are reflected in immediate adjustment of the alternator 1 output as a result of the line voltage feedback signal and the exciter field and armature feedback signals on the base 45 of the error detector 46. When the field is de-energized, the low rated transistors 61, 62 and 70 are protected from excess voltages, and the voltage surge in the line that accompanies the decay of the exciter field 16 is minimized by dissipating the collapsing magnetic field of the exciter field 16 through the battery 18 against its polarity.

The improved operating characteristic is extremely important, but equally important is the fact that the present invention makes it presently available in commercial units at an affordable cost.

I claim:
1. A voltage regulator comprising the combination of:
   a field winding of a generator controlling regulated voltage;
   a D-C source for energizing said field winding and having positive and negative terminals;
   a field forcing switch means connected in series between one of said terminals of said source and said field winding;
   a field control switch means connected in series between the other of said terminals of said source and said field winding;
   a negative forcing discharge circuit for said field winding connecting said field winding across said D-C source and containing unidirectional conducting components to block field energizing current and conduct induced voltages from said field through said D-C source against said D-C source.

2. A voltage regulator as set forth in claim 1 wherein:
   said field forcing switch means is connected between said positive terminal of said D-C source and one end of said field winding;
   and said field control switch means is connected between said negative terminal of said D-C source and an opposite end of said field winding.

3. A voltage regulator as set forth in claim 2 wherein:
   said discharge circuit includes one leg connecting said opposite end of said field winding to said positive terminal of said D-C source and containing a diode oriented to conduct current from said opposite end of said field winding to said positive terminal of said D-C source, and a second leg connecting said negative terminal of said field battery to said one end of said field winding and containing a diode oriented to conduct current from said negative terminal of said D-C source to said field winding.

4. A voltage regulator as set forth in claim 1 wherein:
   said generator is an exciter generator having an armature with output terminals connected across said armature;
   and an alternator has an armature and a field, said field being connected to said output terminals of said exciter generator armature to be energized thereby and said alternator armature having output terminals connected to a power line.

5. A voltage regulator as set forth in claim 1 wherein:
   said field control switch means has a control element adapted to receive a control signal whereby the conductivity of said field control switch means is controlled;
   said field forcing switch means has a control element connected to said field control switch means whereby said field forcing switch means is rendered conductive when said field control switch means is conductive and said field forcing switch means is rendered nonconductive when said field control switch means is nonconductive;
   and an error detector controls said control signal to said control element of said field control switch means to said field control switch means.

6. A voltage regulator as set forth in claim 4 wherein:
   a line voltage detector is connected across said power line and includes a rectifier having output terminals, a filter connected across said output terminals, a feedback signal potentiometer connected to said filter and a Zener diode connected across said filter to provide a fixed reference voltage;
   said error detector includes an NPN transistor having a base connected to receive said feedback signal and an emitter collector circuit connected across said D-C source;
   and said control element of said field control switch means is controlled by emitter collector circuit of said error detector transistor.

7. A voltage regulator for a generator comprising the combination of:
   a generator connector to a power line and having a field;
   a line voltage detector connector across said power line to sample line voltage and adapted to provide a feedback proportional to said line voltage;
   and a variable excitation source connected to said field of said generator and including an exciter generator with an exciter armature and an exciter field, a D-C source for energizing said exciter field, a detector transistor with a base connected to receive said feedback signal and capacitively coupled to said exciter armature, a collector-emitter circuit of said detector transistor being connected across said D-C source, and a field control transistor connecter between said D-C source and said exciter field and responsive to the conductivity of said collector-emitter circuit of said detector transistor to control current from said D-C source to said exciter field.

8. A voltage regulator for a generator comprising the combination of:
   a generator connected to a line and having a field;
   an exciter generator having an exciter armature connected across said generator field and an exciter field;
   a D-C source for energizing said exciter field;
   a line voltage detector connected to said line and adapted to provide a feedback signal proportional to line votage;
   an error detector transistor having a base connected to receive said feedback signal and a collector and emitter connected across said D-C source;
   an amplifier transistor having a base connected to said collector of said detector transistor, and an emitter and a collector connector between said D-C source and said exciter field;
   a field control transistor having a base connected to said emitter of said amplifier transistor, and a collector and an emitter connected between said field winding and said D-C source;
   said exciter field being capacitively coupled to said base of said detector transistor to provide a positive feedback which reinforces said line feedback signal.

9. A voltage regulator for a generator as set forth in claim 8 wherein:
   said control transistor is connected to a negative terminal of said D-C source and a negative end of said dynamo field,
   a field forcing transistor having a base connected to said collector of said control transistor has its emitter-collector circuit connected between a positive terminal of said D-C source and a positive end of said dynamo field, and a field forcing circuit containing a diode oriented to block current flow from said D-C source connects said negative end of said dynamo field to said positive terminal of said D-C source and said positive end of said dynamo field to said negative terminal of said D-C source.

10. A voltage regulator for a generator as set forth in claim 8 wherein:
said exciter armature is connected to the base of said detector transistor through a low pass filter and a high pass filter to stabilize said voltage regulator.

References Cited

UNITED STATES PATENTS

| | | | |
|---|---|---|---|
| 2,920,259 | 1/1960 | Light | 321—2 |
| 3,351,845 | 11/1967 | Roof et al. | 322—28 X |

ORIS L. RADER, Primary Examiner

H. HUBERFELD, Assistant Examiner

U.S. Cl. X.R.

322—73, 88